United States Patent [19]

Mention et al.

[11] Patent Number: 4,539,114
[45] Date of Patent: Sep. 3, 1985

[54] ROTARY HORIZONTAL TABLE TYPE FILTER

[75] Inventors: Jean-Paul Mention, Saint-Clair du Rhone; Jean Aoustin, Rouen; Bernard Wallon, Mont-Saint-Aignan, all of France

[73] Assignee: Rhone-Poulenc Chimie de Base, Courbevoie, France

[21] Appl. No.: 470,302

[22] Filed: Feb. 28, 1983

[30] Foreign Application Priority Data

Mar. 2, 1982 [FR] France .............................. 82 03382
Mar. 2, 1982 [FR] France .............................. 82 03383

[51] Int. Cl.³ .............................................. B01D 35/12
[52] U.S. Cl. .................................. 210/330; 210/345; 210/395
[58] Field of Search ............... 210/330, 341, 344, 345, 210/395

[56] References Cited

U.S. PATENT DOCUMENTS

| | | | |
|---|---|---|---|
| 3,080,063 | 3/1963 | Krynski et al. | 210/330 |
| 3,361,262 | 1/1968 | Orr et al. | 210/330 |
| 3,485,375 | 12/1969 | Lee | 210/330 |
| 3,587,862 | 6/1971 | Lee | 210/330 |

FOREIGN PATENT DOCUMENTS 2085746 5/1982 United Kingdom ............... 33/22

*Primary Examiner*—Thomas Wyse
*Attorney, Agent, or Firm*—Burns, Doane, Swecker & Mathis

[57] ABSTRACT

A horizontal rotary table filter includes a device connecting the filter table to the carrier structure which provides freedom of movement between the two in the radial direction, to thereby maintain the filter table in a substantially planar condition under adverse operating conditions. The device preferably includes a radially oriented slideway connected to one of the table and the carrier structure, and slide shoes or rollers connected to the other of the table and the structure and disposed within the slideway. In addition to enabling relative radial movement, the device is so constructed as to provide a space between the table and the structure and thereby thermally insulate one from the other. Also disclosed is a more stable carrier structure which includes circumferential and diagonal connecting members disposed between adjacent radial gussets.

28 Claims, 16 Drawing Figures

ROTARY HORIZONTAL TABLE TYPE FILTER

BACKGROUND OF THE INVENTION

The present invention relates to a rotary horizontal table type filter and a carrier structure for such a filter.

Horizontal table type filters generally comprise a carrier structure which is continuously rotated at a constant speed by a suitable device, and a circular filtration table which is mounted on the carrier structure.

More specifically, the carrier structure generally comprises a ring which is driven by a motor, radial gussets or angle plates which are fixed to the ring and circumferential gussets or angle plates which are fixed to the radial gussets. The carrier structure can be constructed of mild steel, for example.

The filtration table comprises a plurality of sectors each including radial walls, one or more bottom walls, circumferential walls defining one or more trapezoidal box sections and an upper wall formed by a sheet of metal with orifices and on which the filter cloth is fixed. The table can be constructed of stainless steel, for example. The bottom of each box section is connected to a vacuum circuit by conduits, which provide for removal of the filtration liquid that passes into the box section through the filter cloth. An example of such a filter is disclosed in French Pat. No. 1,327,693.

The table is usually assembled to the carrier structure by bolts in such a way that the two components are completely fixed relative to each other. More specifically, the walls which form the bottom of the table and which may be configured as trapezoidal troughs or buckets are welded at their periphery to the radial and circumferential walls of the table. The radial walls of the table are mounted in pairs so as to straddle and grip the upper end of the radial gussets of the carrier structure. Each pair of walls are connected together by a first series of bolts and they are also fixed to the corresponding radial gusset by a second series of bolts.

Moreover, the circumferential walls of the table which define the box sections are supported on and bolted to corresponding circumferential gussets of the structure.

Although filters of this type are in operation, provide a high degree of reliability and permit high production capacity, they may nonetheless have limitations under certain circumstances.

More specifically, it has been observed that the filtration table may be deformed outside tolerance limits in the operation of large-scale filters, or with increasing severity in certain conditions of performance under which the filter is used, for example with higher temperatures or tonnages, or when materials with a very high coefficient of expansion are used for the filter.

Thus, it has been found that the table, although flat when cold, may become slightly spherical during the operation thereof, with the center of the table rising and the outward portion being displaced downwardly. The sectors forming the table thereby tend to pivot about the drive ring of the carrier structure.

Such deformation is troublesome, and can complicate or interfere with extraction of the filter cake. For example, when the filter cake extraction operation is performed by an endless screw which is disposed in a horizontal position at a well defined height above the table, the result of any increase in the height of the screw above the table is to reduce the quantity of cake extracted, while any reduction in the above-mentioned height gives rise to the danger of the filter cloth being torn by the screw. It is therefore necessary for the position of the extraction screw to be adjusted at relatively frequent intervals to accomodate for such changes in its position.

In addition, the stresses generated by deformation of the table may result, inter alia, in accelerated wear of the filter or may cause fractures of the welds, in particular between adjacent sectors, and that in turn may cause the table to leak, with the danger of the filtrate passing between the table and the structure.

OBJECT OF THE INVENTION

The present invention is directed to improvements in filters of the above-described type, so as to facilitate proper operation thereof. In particular, it is the general object of the invention to maintain the initial flatness of the table and to make the table perfectly fluid-tight, under severe operating conditions, particularly at high temperature, without causing undesirable stress or deformation phenomena in the filter.

SUMMARY OF THE INVENTION

In pursuit of these objectives, a rotary horizontal table type filter of the type comprising a carrier structure driven in rotation by a motor and a circular horizontal filtration table supported by the carrier structure is constructed in accordance with the present invention such that the table and the carrier structure are connected by means having at least one degree of freedom to provide for entrainment of the table by the carrier structure and to permit relative displacement of one relative to the other in at least one direction.

In accordance with one of the main features of the invention, the above-mentioned connecting means provides at least one radial degree of freedom of the table relative to the carrier structure.

In accordance with a particular embodiment of the invention, the connecting means comprises an assembly of a male element and a female element, respective ones of these elements being fixed with respect to the table and the carrier structure.

In a preferred embodiment of the invention, the female element is a radial slideway, preferably of substantially U-shaped profile, and the male element comprises at least one roller and/or at least one slide shoe of a metal or a material having a low coefficient of friction with respect to the female element. The male element is housed in the slideway in such a manner that the roller or slide shoe is normally in contact with the bottom of the slideway.

Moreover, another aspect of the invention concerns a circular carrier structure for supporting and rotatably driving the horizontal filtration table of a rotary filter. This carrier structure comprises:

a first drive ring engaging a motor and resting on a first rolling track;

a second internal connecting ring;

radial assembly elements such as gussets which are fixed and rest on the first ring and which are fixed at their inward ends to the second ring member;

one or more radially spaced series of circumferential assembly elements, which are also circumferentially spaced, that are fixed with respect to the radial assembly elements and which are disposed in pairs on respective sides thereof; and circumferential connecting means between the circumferential elements of the same series and diagonal connecting and bracing means disposed between successive radial elements.

The assembly of the table and the structure according to the invention is particularly advantageous because it partly separates those two components, and therefore permits them to move relative to each other during the operation of the filter, in dependence on the different stresses to which thay are respectively subjected, particularly as a result of temperature gradients between those components and within each of the two components.

In addition, regardless of the partial separation between the carrier structure and the table resulting from the connecting means, such connecting means can carry and transmit all the forces of a mechanical nature which occur when the filter is rotated, and they therefore ensure that the table is correctly driven by the carrier structure.

Finally, by virtue of its design, the carrier structure of the invention provides a precisely flat configuration under the most severe operating conditions.

The invention will be better appreciated, and other features, details and advantages thereof will be more clearly apparent from the following description of the invention, with reference to the accompanying diagrammatic drawings illustrating a number of exemplary embodiments of the invention.

DETAILED DESCRIPTION

Figure 1:
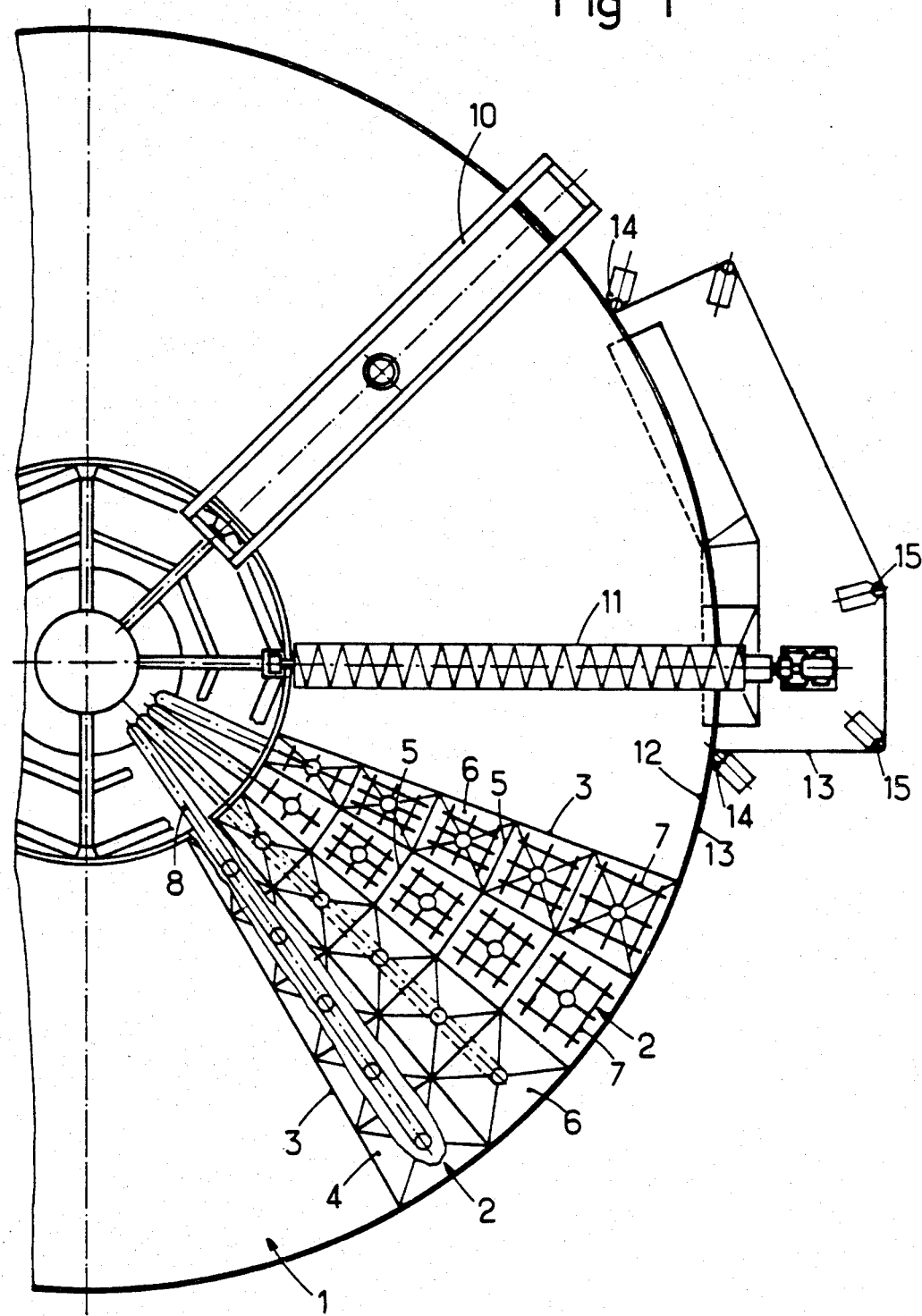
FIG. 1 is a partly exploded plan view of part of one embodiment of a filter implementing the invention.

Referring to FIG. 1, a filter of the type to which the invention pertains comprises a horizontal filtration table 1 made of stainless steel, for example. In a known manner, the table 1 comprises a plurality of sectors 2, the number of which may vary in dependence on the size of the filter and can be, for example, between 30 and 36.

Each of the sectors comprises radial walls 3, one or more bottom walls 4 of a substantially inverted pyramidal shape, and circumferential walls 5, thereby defining one or more box sections or troughs 6, there being five such box sections per sector in the illustrated embodiment. The box sections 6 are closed at the top by a metal plate (not shown) which has orifices therethrough and on which the filter cloth (not shown) is fixed. In order to prevent the metal plate from bending under the effect of the vacuum, sheet metal supports 7 are provided in each box 6.

In FIG. 1, for the sake of clarity, only a few sectors are illustrated with the upper metal plate being removed, just as the supports 7 are shown in only some sectors.

Figure 2:
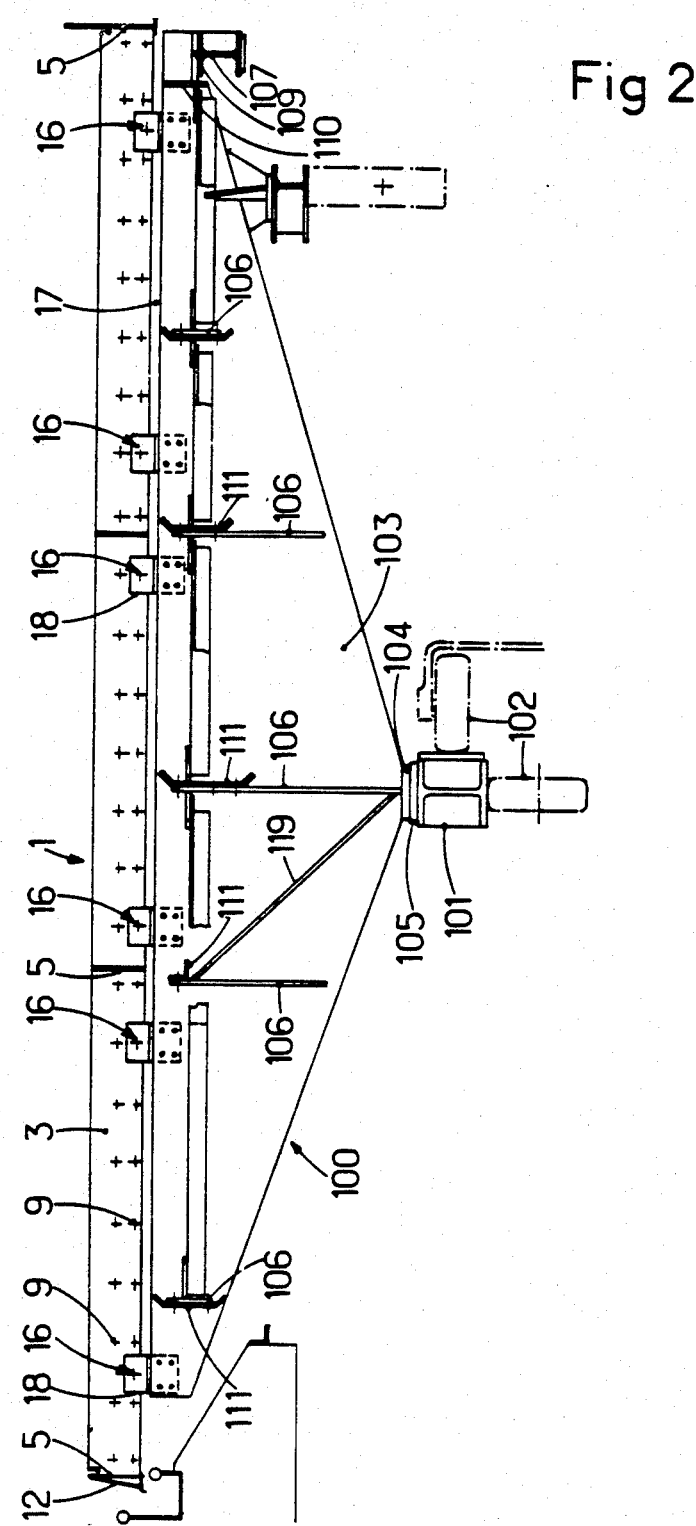
FIG. 2 is a view in cross-section of half of a filter implementing the invention.

FIG. 2 is a cross-sectional view of half of a filter of the same type as that shown in FIG. 1, but in which each sector comprises only three boxes or troughs 6. The center of the filter is disposed to the right in FIG. 2.

As shown in FIGS. 1 and 2, the bottoms of the boxes 6 are connected to a vacuum circuit by filtrate collectors 8. The opposed redial walls 3 of two adjacent sectors are bolted to each other over their entire length and over the portion thereof which is disposed below the bottoms of the troughs or boxes 6. There are generally two rows of bolts as indicated by the reference numeral 9.

Disposed above the filtration table, and as shown diagrammatically in FIG. 1, the filter comprises means 10 for distributing the slurry to be filtered, for example a scoop-like arrangement of the type disclosed in French Pat. No. 78 05011. Also included are means 11 for removing the filter cake, for example an extraction screw, and means (not shown) for washing or cleaning the filter cloth, disposed between the means 10 and 11.

In a known manner, an endless belt 13 of flexible material is in engagement with a substantial portion of the perimeter 12 of the table. The belt 13 comes out of contact with the table in the region of the table that is beneath the above-mentioned means for removing the filter cake and for cleaning the filer cloth. Rollers 14 and 15 respectively ensure that the belt is held against the perimeter 12 of the table, and that it is tensioned.

Referring more particularly to FIG. 2, it can be seen that the table 1 is supported by a carrier structure 100, made for example of mild steel. In essence, the structure 100 comprises a drive ring 101 engaging a motor. The ring 101 rests on a rolling track formed by guiding and centering rollers 102. The structure 100 also includes radial assembly elements 103, such as gussets or angle plates, which are fixed with respect to the ring and which rest thereon by way of base plates 104 and 105. The structure 100 also comprises a plurality of radially spaced series of circumferential or lateral assembly elements 106 such as vertical gussets or angle plate members which are disposed in pairs on respective sides of each radial gusset member 103.

In general, the table and the carrier structure are disposed one above the other so that a radial gusset 103 of the carrier structure is disposed in line with, that is to say, below, two contiguous radial walls 3 of two adjacent sectors, and in the same vertical plane. It is also possible to position a pair of circumferential elements 106 of the carrier structure substantially in line with a circumferential wall 5 of a sector defining two boxes.

It can be seen from FIG. 2 that, in accordance with one feature of the invention, the filtration table does not rest on the carrier structure directly but rather by way of connecting means 16. The connecting means 16 provide on one hand for transmission of the lateral forces and therefore provide for drive of the table by the carrier structure, while on the other hand they permit a movement of the table relative to the carrier structure in at least one direction. In the illustrated construction, the connecting means 16 are designed so as to provide at least one radial degree of freedom of the table relative to the carrier structure. In other words, the radial walls 3 shown in FIG. 2 can move relative to the radial gusset 103 in a direction parallel to the plane of FIG. 2.

Thus, the table and the carrier structure are partly disconnected from each other, in contrast to the filters in the prior art, and the assembly of one component to the other is not absolutely rigid.

In accordance with another feature of the invention, the carrier structure 100 and the filtration table 1 are separated in height by a space 17 in which the connecting means 16 is at least partly disposed. The air in the space 17 provides thermal insulation between the table and the carrier structure, which are typically at different temperatures during operation of the filter. For example, the table is in direct contact with a slurry, the temperature of which may vary between 50° C. and 100° C. or higher, whereas the carrier structure remains at the mean ambient temperature. Such insulation limits the danger of deformation of the carrier structure due to thermal expansion and contraction.

Generally, the connecting means each comprise an assembly of a male element and a female element. One of the elements of the assembly can be fixed to the lower end of the two opposed radial walls of two adjacent sectors, while the other can be fixed to the upper end of a radial element of the carrier structure, for example a gusset which is disposed in line with the above-mentioned radial walls when the arrangement of the structure relative to the table is of the type described hereinbefore.

The female element can comprise a radial slideway that is oriented longitudinally along a radius of the filter, and constructed, for example, of stainless steel. The slideway is preferably of a substantially U-shaped configuration.

FIG. 2 shows such a slideway 18 mounted on a gusset 103. The male element (not shown) is fixed with respect to the walls 3 and is housed in the slideway 18.

In addition, the slideway can be partly closed by a pair of guide members which retain the male element in the slideway and which limit the upward movement thereof. Depending on the circumstances involved, the guide members can be added to or can be formed integrally with the slideway.

Different embodiments of the connecting members are illustrated in greater detail in FIGS. 3 to 8. Referring to the embodiment of FIG. 3, the opposed radial walls 3 of two adjacent sectors and the bottom walls 4, which thereby define troughs or boxes 6, are shown. Welded to each of the opposing faces of the walls are bosses or projections 19 which are held in engagement with each other by a first series of bolts 9 (which are indicated diagrammatically by a line). A radial gusset 103 of the carrier structure is disposed in line with the radial wall 3.

The lower ends of the walls 3 are disposed in a U-shaped slideway 18 which is fixed on the radial gusset 103. In the illustrated embodiment, two side plates 20 are welded to the outside of the bottom of the slideway and receive the gusset 103 between them. They permit the slideway to be mounted astride the gusset 103. Double bolting as illustrated at 21 rigidly secures the slideway 18 on the gusset. Two screwthreaded rods 22 connect one of the plates 20 to a structural element 23 which is fixedly disposed on one side the gusset, perpendicular thereto. The structural element can also be fixed with respect to a circumferential gusset 106. Oblong holes, or slots, are provided in the side plates 20 for the bolts, so that the height of the slideway can be adjusted by means of the screwthreaded rods 22.

The upper part of the slideway is partly closed by guide members 24 which are disposed perpendicular to the side walls of the slideway. To permit the guide members to be secured to the slideway, they have a screwthread and the wall of the slideway has a corresponding aperture in which a clamping screw 34 is received, the screw 34 being shown by a line in FIG. 3.

The male element of the assembly comprises two spindles 25 which pass through holes disposed substantially at the lower end of each of the radial walls 3. The spindles 25 are welded to the opposed surfaces of the radial walls 3 and extend perpendicularly from their opposite faces.

Mounted on each spindle 25 is a slide shoe or skid 26. Each shoe 26 completely surrounds the spindle and therefore bears against the inside of the bottom of the sideway, with a certain clearance with respect to the guide members 24. The arrangement can also be provided with a certain clearance between the shoes 26 and the side walls 29 of the slideway. With respect to the shoes 26, they preferably have a low coefficient of friction relative to the material forming the slideway.

Generally, the shoes 26 can be of any material which, in addition to the above-mentioned coefficient of friction, have a high level of resistance to abrasion, aging, deformation and creep, and a high level of resistance to chemical subtances such as acids, solvents or oxygen.

For example, and in particular when the slideway comprises stainless steel, the shoe 26 can be of a metal alloy such as white metal or babbitt metal or a copper-base alloy such as bronze. They can also comprise a synthetic material such as a polymer having a high molecular weight (for example from 0.5 to 4 million) of the polyethylene type, in particular a glass fiber-reinforced polyethylene, polpropylene, glass fiber-reinforced polyamide 6, graphite-filled polytetrafluoroethylene, difluorinated polyvinylidene and graphite.

The shoes 26 can be of a prismatic or a substantially parallelepipedic shape. As can be seen in particular from FIG. 3, the shoes have a central aperture 27 which extends through the entire thickness thereof, so that on assembly they can be fitted on to the spindles 25. They could also have a central slot opening at two or three faces thereof, to permit them to be slid on to the spindle upon assembly of the arrangement. Moreover, they can be chamferred at the intersection 28 between the face which comes into contact with the bottom of the slideway and the face adjacent the side wall 29 of the slideway. This chamfer, upon assembly of the arrangement, permits the shoe to be more easily introduced into the slideway when the two components are not precisely positioned opposite each other.

It should be noted moreover that the two spindles can be replaced by a single spindle passing through the two walls.

Figure 3:
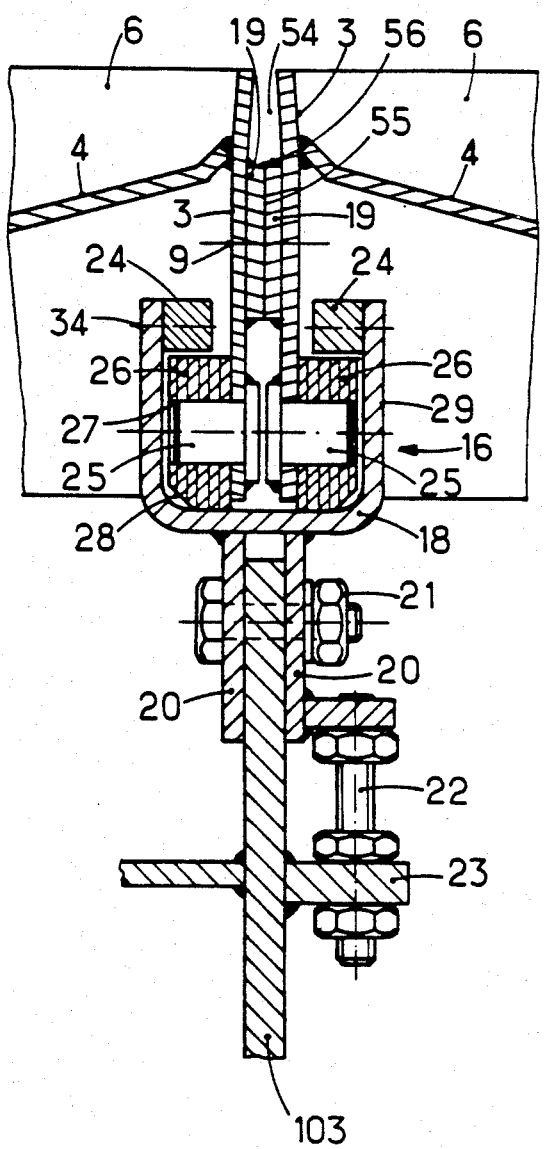
FIG. 3 is a front view of a means for connecting the table to the structure, in a first embodiment of the invention.

It will be appreciated that a plurality of assemblies identical to that shown in FIG. 3 can be mounted along the same radial gusset of the carrier structure. The number of such assemblies depends on the conditions of use to which the filter is subjected. Preferably, there are at least two assemblies per box. That is to say, there are at least two assemblies over a length of the same gusset which is disposed below a box, or the length included in the space defined between two circumferential walls 5 between two boxes, it being appreciated that one element of the assembly is fixed to the gusset and the other is fixed to the corresponding radial walls. In addition, the above-mentioned assemblies are preferably disposed in the vicinity of the circumferential walls. Such an arrangement of the connecting assemblies is shown in FIG. 2. Finally, it should be noted that the foregoing observations concerning the arrangement of the connecting assemblies on the table and the carrier structure apply to all the different embodiments of the connecting assemblies described hereinafter.

When the filter is in operation, the slideway therefore carries downwardly directed vertical forces and lateral forces, such as those due to the drive torque or due to inertia when the filter is started or stopped. In addition, the guide members 24 carry the upward vertical forces. Furthermore, the shoes 26 are slidable within the slideway 18 in response to any radial stress.

Figure 4:
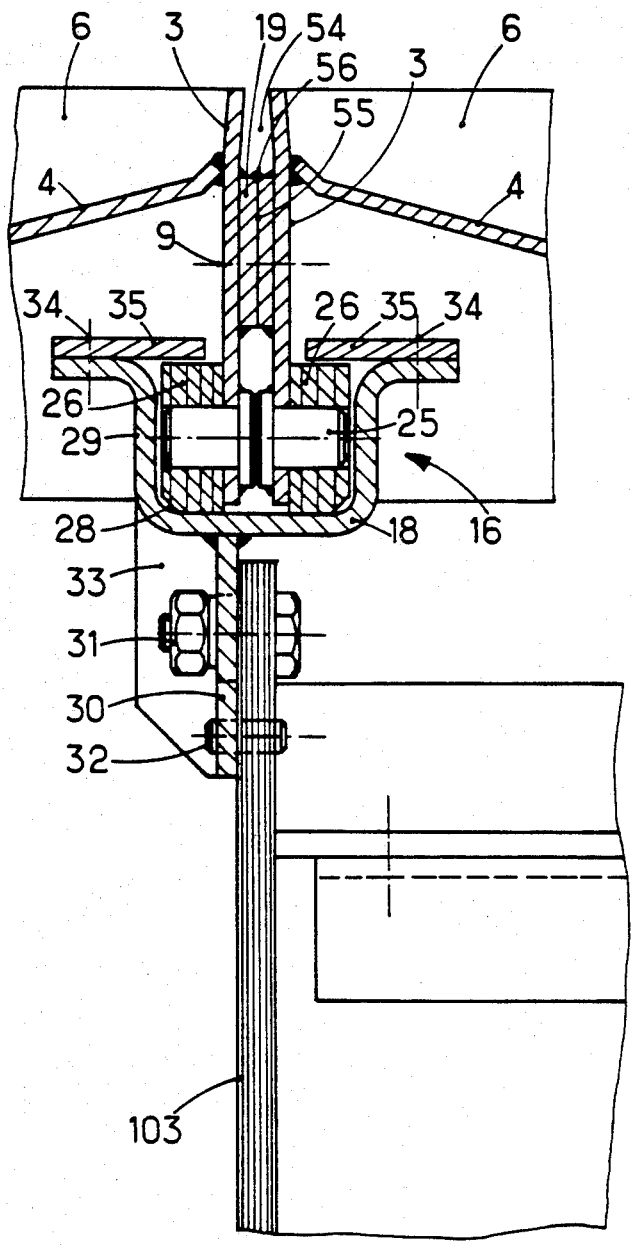
FIG. 4 is a front view of a connecting means, in a second embodiment of the invention.
Figure 5:
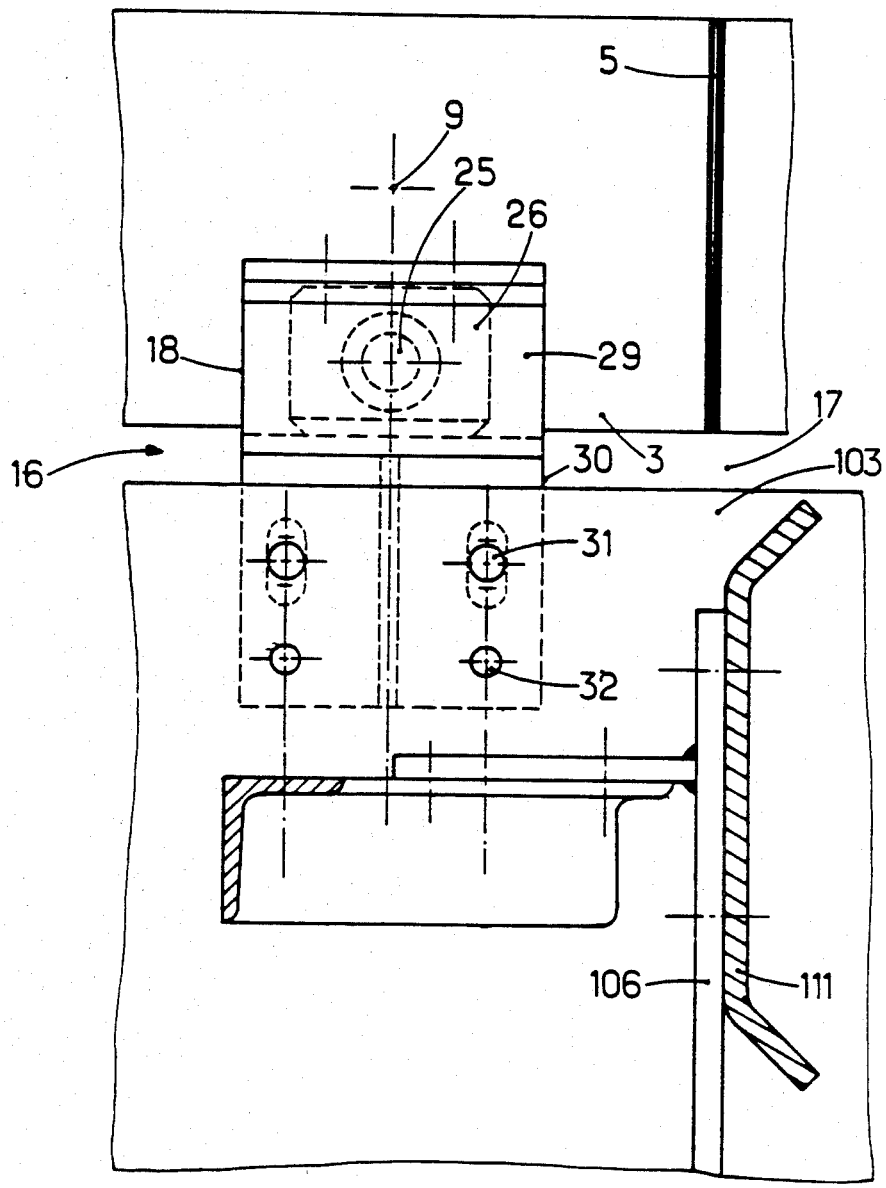
FIG. 5 is a side view of the connecting means shown in FIG. 4.

FIG. 4 and 5 show an alternative embodiment of a connecting means according to the invention which fairly closely resembles the embodiment of FIG. 3. The same reference numerals are used to denote the elements of the table and the carrier structure, which are identical to those shown in FIG. 3.

In this embodiment, the slideway 18 has only a single side plate 30 which bears against the radial gusset 103. As in the above-described embodiment, double bolting 31 in oblong slots in the plate 30 fix the slideway to the gusset. A fitting pin 32 is provided to permit correct height positioning without adjustment if the slideway has to be reassembled. Disposed in the center of the side plate 30, between the bolts and perpendicular to the plate 30 and to the slideway, is a reinforcing rib 33. The vertical side walls 29 of the slideway, in the upper portion thereof, are curved outwardly so as each to define a horizontal flat surface to which guide members 35 are bolted as indicated at 34.

It will be appreciated that, in the operation of the filter, the above-described assembly performs in the same manner as the previously described embodiment. This observation also applies to the embodiments described hereinafter.

Figure 6:
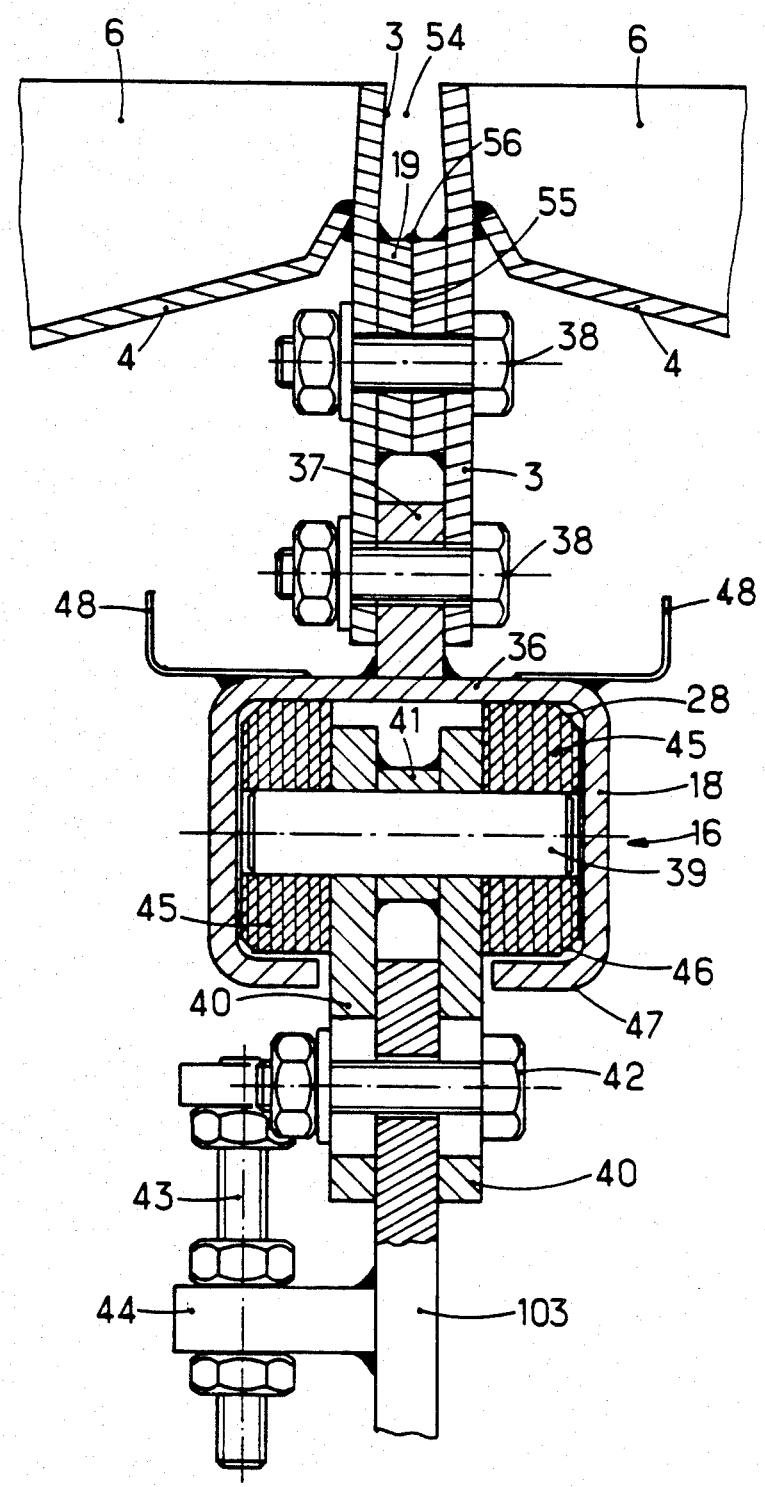
FIG. 6 is a front view of a connecting means, in a third embodiment of the invention.

FIG. 6 shows a third embodiment of a connecting meens according to the invention. The elements of the table and the structure involved are denoted by the same reference numerals as before. In this embodiment, the female element is also a slideway which, in this construction, is fixed with respect to the filtration table, while the male element comprises a spindle on which one or more slide shoes are mounted and is fixed on or towards the upper end of a radial assembly element or gusset of the carrier structure, which is disposed in line with the slideway.

More precisely, in a central plane perpendicular to its outside bottom portion 36, the slideway has a member 37 welded thereto to form a lug which is received in the lower portion of the free space defined by the bosses 19 between two opposed radial walls 3 of two adjacent sectors. All those elements are secured together by double bolts 38.

The spindle 39 of the male element is mounted to the upper part of two side plates 40 which are separated at the level of the spindle 39 by an intermediate spacer 41 and which receive between them, in their lower part, a radial gusset 103 of the structure. The assembly is secured together, as in the embodiment shown in FIG. 3, by a system comprising a bolt 42 and screwthreaded rods 43 mounted on a support 44 formed by an element of the carrier structure 100.

Two slide shoes 45 are mounted on each portion of the spindle 39 which project from respective sides of the side plates 40. The shoes 45 are of the same type as those described hereinbefore. It will be noted however that they have a second chamfer 46 at the intersection between the faces which oppose a side leg of the slideway and the guide members 47 which, in the embodiment illustrated here, form an integral part of the slideway. It will be appreciated that the shoes of the other embodiments can generally be provided with a second chamfer of this type, apart from the particular embodiment of FIG. 6.

Angle members 48 are fixed to the outside of the base 36 of the slideway, on respective sides of the two radial walls 3. The angle members can extend from a slideway of a first assembly to another or to the other slideway of other assemblies which are mounted on the same gusset 103 over the entire length of a gusset member. These angle members are disposed so as to form a gutter arrangement which can recover any liquid or filtrate which might have infiltrated below the filtration table and in particular at the junction of two successive sectors. Such filtrate can then be discharged at the outside or inside periphery of the filter.

This embodiment has the advantage of making use of the slideway 18 and the angle members 48 to protect the shoe 45 from any contact with a fluid which may originate from the table 1, for example acid.

Figure 7:
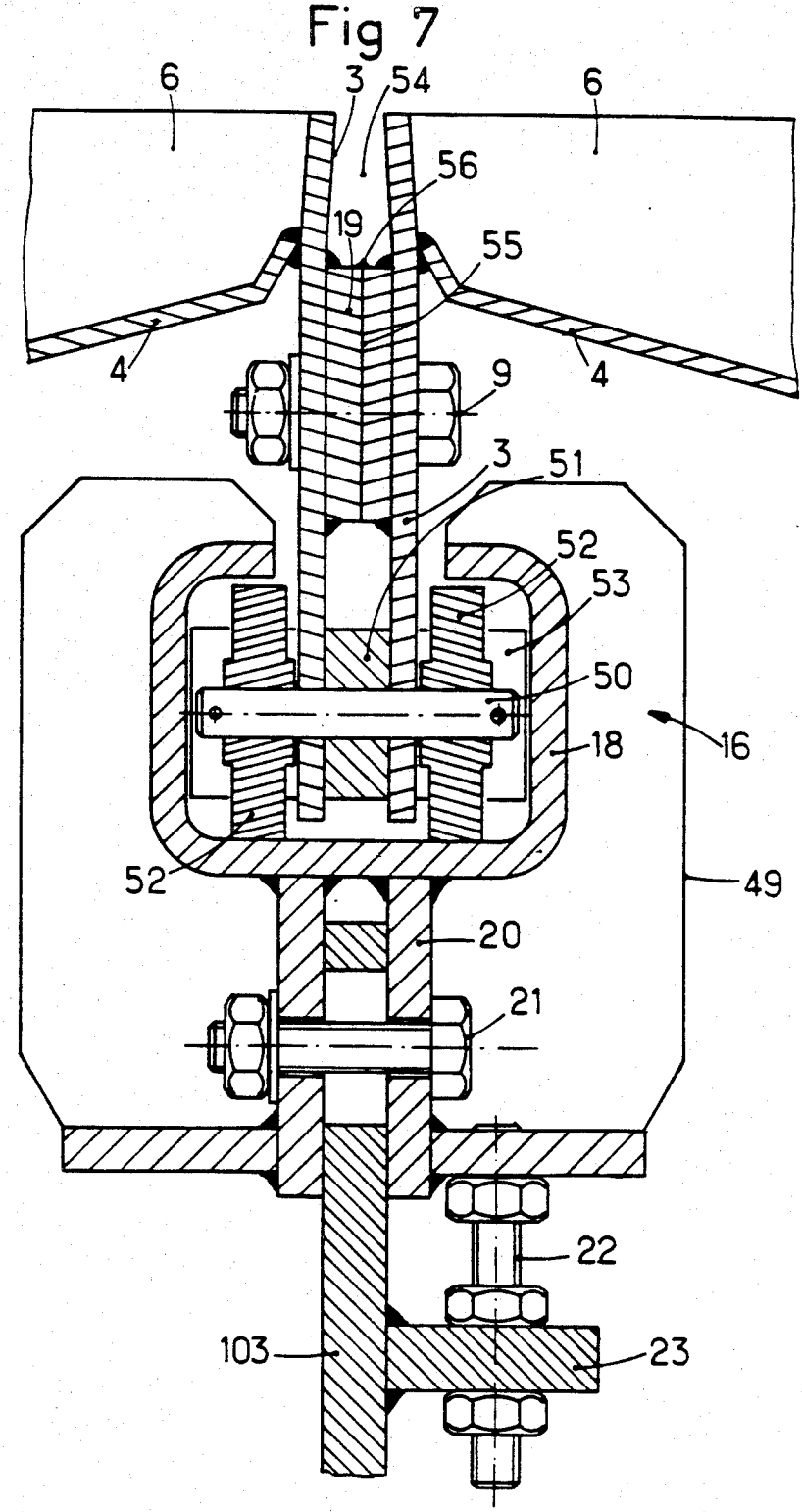
FIG. 7 is a front view of a connecting means, in a fourth embodiment of the invenbion.
Figure 8:
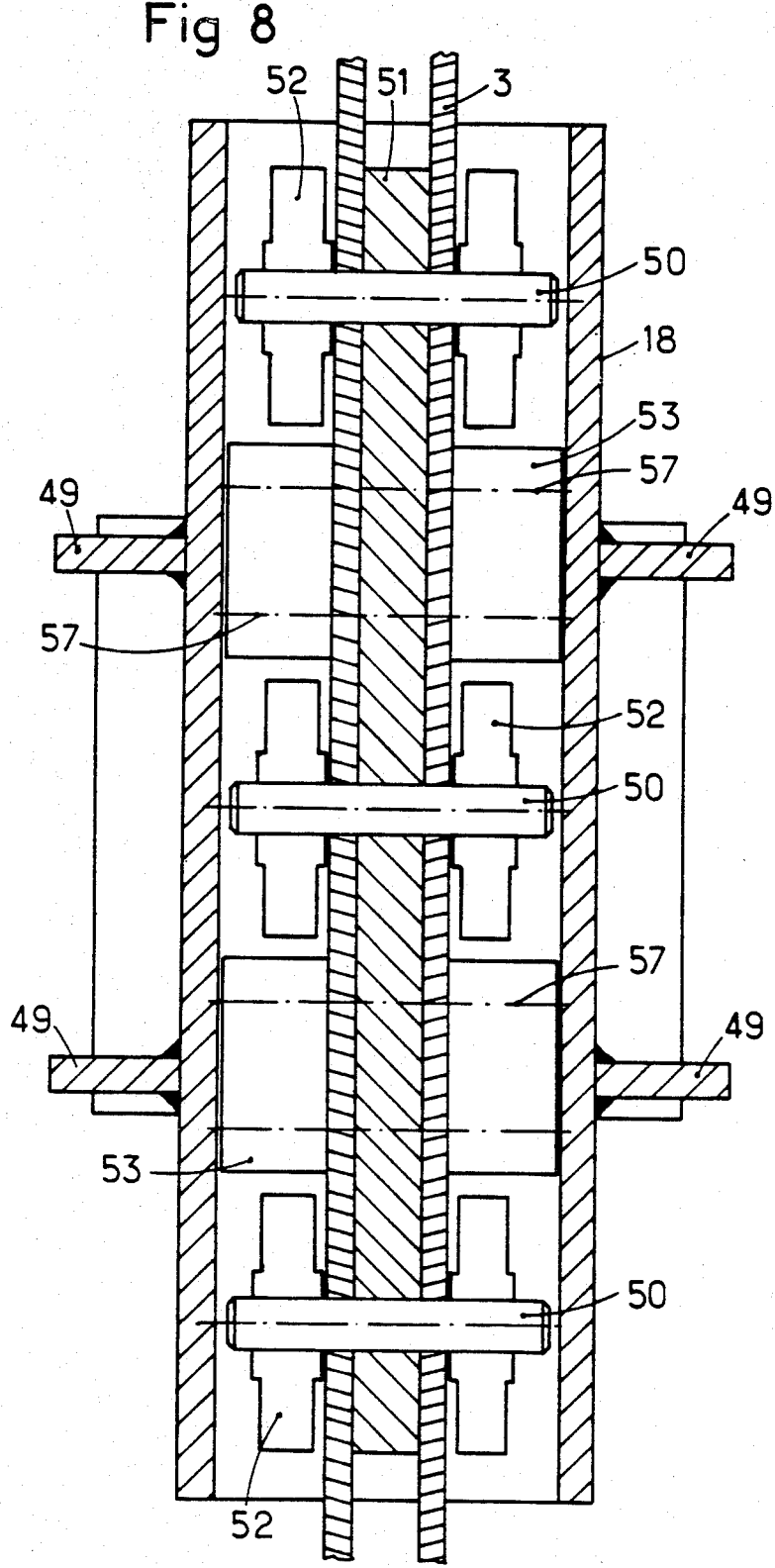
FIG. 8 is a plan view of the connecting means shown in FIG. 7.
Figure 9:
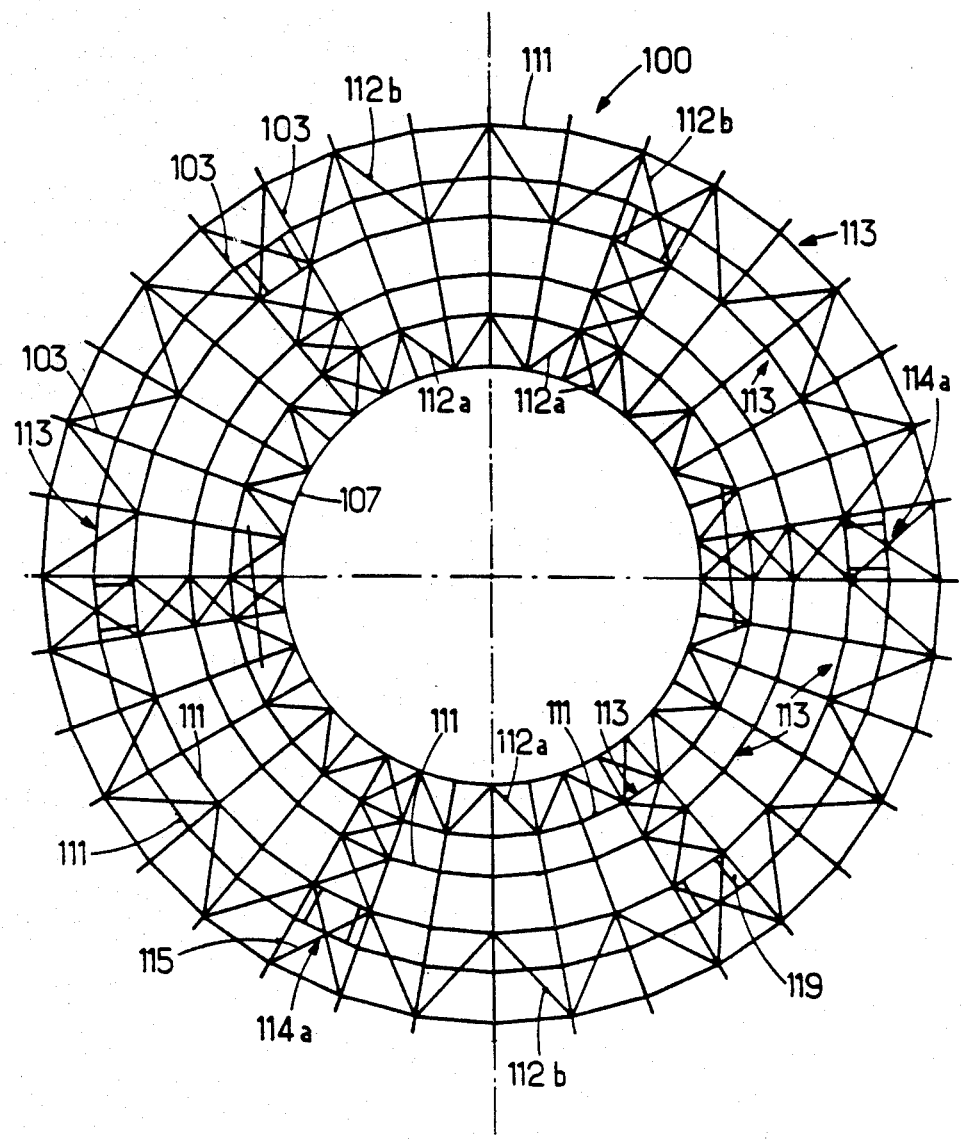
FIG. 9 is a diagrammatic plan view of a first embodiment of a carrier structure for a filter according to the invention.

FIGS. 7 and 8 illustrate another embodiment in which the shoes of the male element are at least partially replaced by rollers. In general, the female element still comprises a slideway, while the male element comprises one or more pairs of rollers which run on the bottom of the slideway, and one or more transverse slide shoes which are diposed parallel to the axis of rotation of the rollers and outside the plane of rolling movement thereof, in particular between two successive pairs of rollers. The slide shoes are capable of coming into contact with the side edges of the slideway.

Referring to FIGS. 7 and 8, a slideway 18 is mounted on a radial gusset in the same manner as the slideway of the embodiment shown in FIG. 3. The slideway 18 can comprise two pairs of reinforcing ribs 49. The male element comprises three spindles 50, or alternatively six half-spindles, which extend through holes disposed substantially at the lower end of each of the opposed radial walls 3 of two adjacent sectors, which are separated at the level of the spindle by a movable spacer 51. Rollers 52 are mounted on each of the outward portions of each of the spindles 50. The rollers 52 can be of any shape and they comprise a material of the same type as that which has been described hereinbefore in relation to the slide shoes. The rollers can be mounted on the spindles by means of any suitable rolling bearing such as a ball-type or needle-type bearing.

In order to transmit lateral forces, the male element further comprises transverse slide shoes 53 which are mounted on the walls 3, for example by countersunk or flush-mounted bolts, as diagrammatically indicated at 57. The shoes are disposed in pairs, each pair being disposed between two pairs of rollers and the shoes of each pair are disposed on each of the non-adjacent faces of the radial walls 3.

As illustrated in FIG. 7, the transverse shoes do not touch the bottom of the slideway, nor the guide members thereof. On the other hand, the width of the shoes is such that they have little or no clearance from the side walls of the slideway, and they prevent any contact between the side walls and the spindles carrying the rollers, or even the rollers themselves.

During the operation of the filter, the rollers 52 roll along the bottom portion of the slideway in response to radial stresses and the transverse shoes 53 transmit the lateral forces.

Another aspect of the invention is concerned with the joint between the adjacent sectors and more partricularly between the radial walls 3 defining such sectors. As described hereinbefore, the radial walls 3 come into contact with each other by way of bosses or projections 19. Referring to FIG. 7, the groove 54 above the bosses 19 function in fixing the filter cloth to the table. More particularly, the cloth is fixed by pushing a rubber keeper or retaining rod or bar into the groove along with the cloth. There is a danger of liquid penetrating through the cloth at the location of the groove, and the liquid can come into contact with the upper part of the bosses 19. It is therefore necessary for the junction 55 between the bosses 19 to be sealed.

Hitherto, the sealing effect was achieved by welding the two bosses. However, such a weld gives rise to two disadvantages. First, when finally assembling the filter at the site at which it is to operate, the weld can give rise to stresses and affect the planar condition of the arrangement, which is normally achieved in pre-assembly adjustments of the filter at the manufacturing site. Secondly, in the operation of the filter, the various stresses which are applied thereto have a tendency to rupture the welds.

According to the invention, the weld is replaced by a resilient sealing member 56 which is disposed at the bottom of the groove between the bosses 19. This sealing member 56 comprises a material which undergoes vulcanisation at ambient temperature, such as for example a silicone. Such a seal, by virtue of its flexibility, is capable of absorbing the movements of the troughs or boxes relative to each other, and thus permits a certain degree of disconnection as between the sectors.

It will be appreciated that it is entirely possible to retain the sealing weld between the bosses, and for the weld to be covered with a seal member of the above-indicated kind. In addition, it will be appreciated that it is possible to use a sealing member of the same kind at any other point in the filter where it might turn out to be useful, for example at the outside edge 12 of the table, at the junction between two adjacent sectors.

The present invention is also concerned with the details of a carrier structure for a rotary horizontal table type filter, in particular for a filter of the type as described above. In fact, in order to provide a filter which operates correctly under severe conditions, in particular at high temperature, it is important for the carrier structure to be of such a design that it maintains its planar configuration to a very precise degree under such conditions.

Different embodiments of the carrier structure will now be described with particular reference to FIGS. 2 and 9 to 16. In this description, the terms internal and external are used to distinguish the components which are closer to or more remote from the center of the circular structure.

Figure 10:
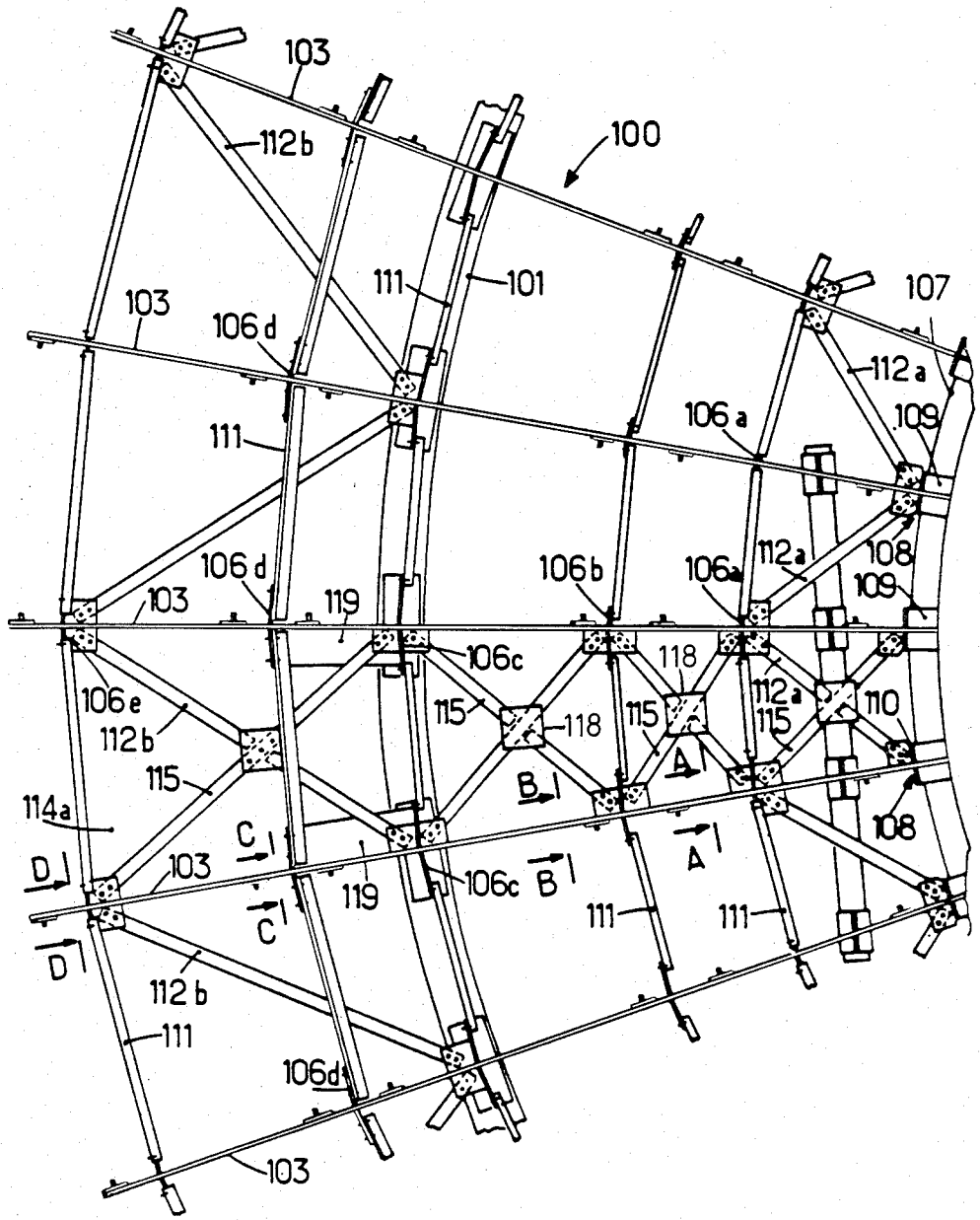
FIG. 10 is a plan view on an enlarged scale of part of the structure shown in FIG. 9.

In general, with reference to FIGS. 2 and 10, the structure 100 comprises a first drive ring 101 on which radial assembly elements 103, such as vertical gussets, rest at their lower ends. In addition, the structure comprises a second internal connecting ring 107 which optionally rests on a second rolling track. The gussets or elements 103 are fixed with respect to the second ring at their internal ends by fixing and stiffening means 108 (FIG. 10). The means 108 can comprise two horizontal flat plates 109 which rest on the ring 107 and which are attached to the lower end of the element 103, which also rests on the ring 107. The means 108 can also include two vertical stiffening members 110 which are attached to the end of the element 103 and which are perpendicular to the element 103 and to the plates 109.

The number of radial gussets depends on the size of the filter and the number of sectors and typically varies, for example, between 30 and 36.

In addition, circumferential assembly elements denoted by the general reference numeral 106, such as gussets, are fixed with respect to the radial element and are disposed in pairs on respective sides of each element in radially spaced series as indicated at 106a, b, c, d and e (FIG. 10).

Figure 14:
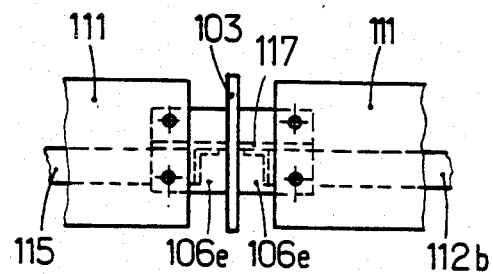
FIG. 14 is a view in cross-section taken along line DD in FIG. 10 of part of the structure shown therein.
Figure 15:
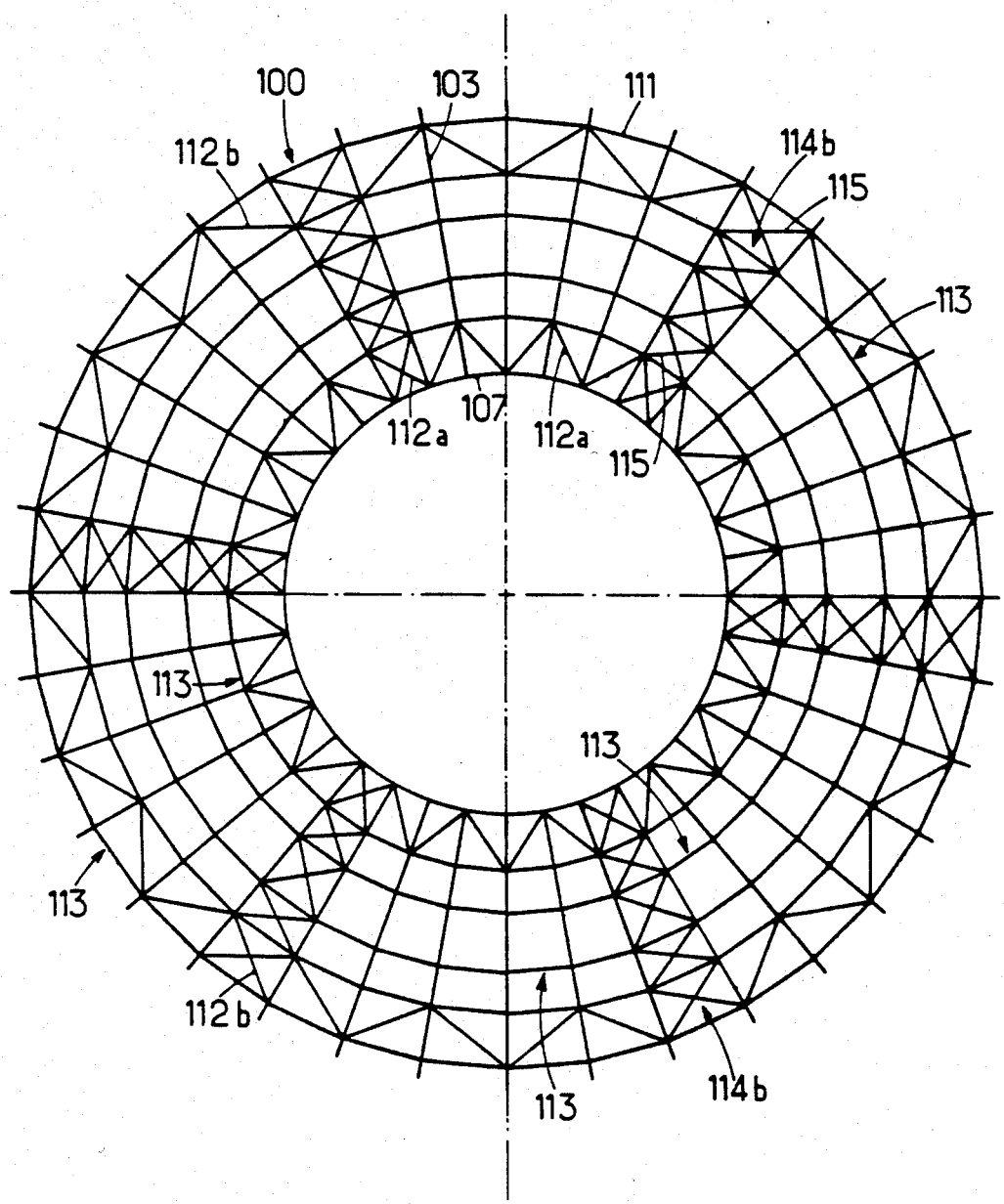
FIG. 15 is a diagrammatic plan view of a second alternative embodiment of a carrier structure according to the invention.
Figure 16:
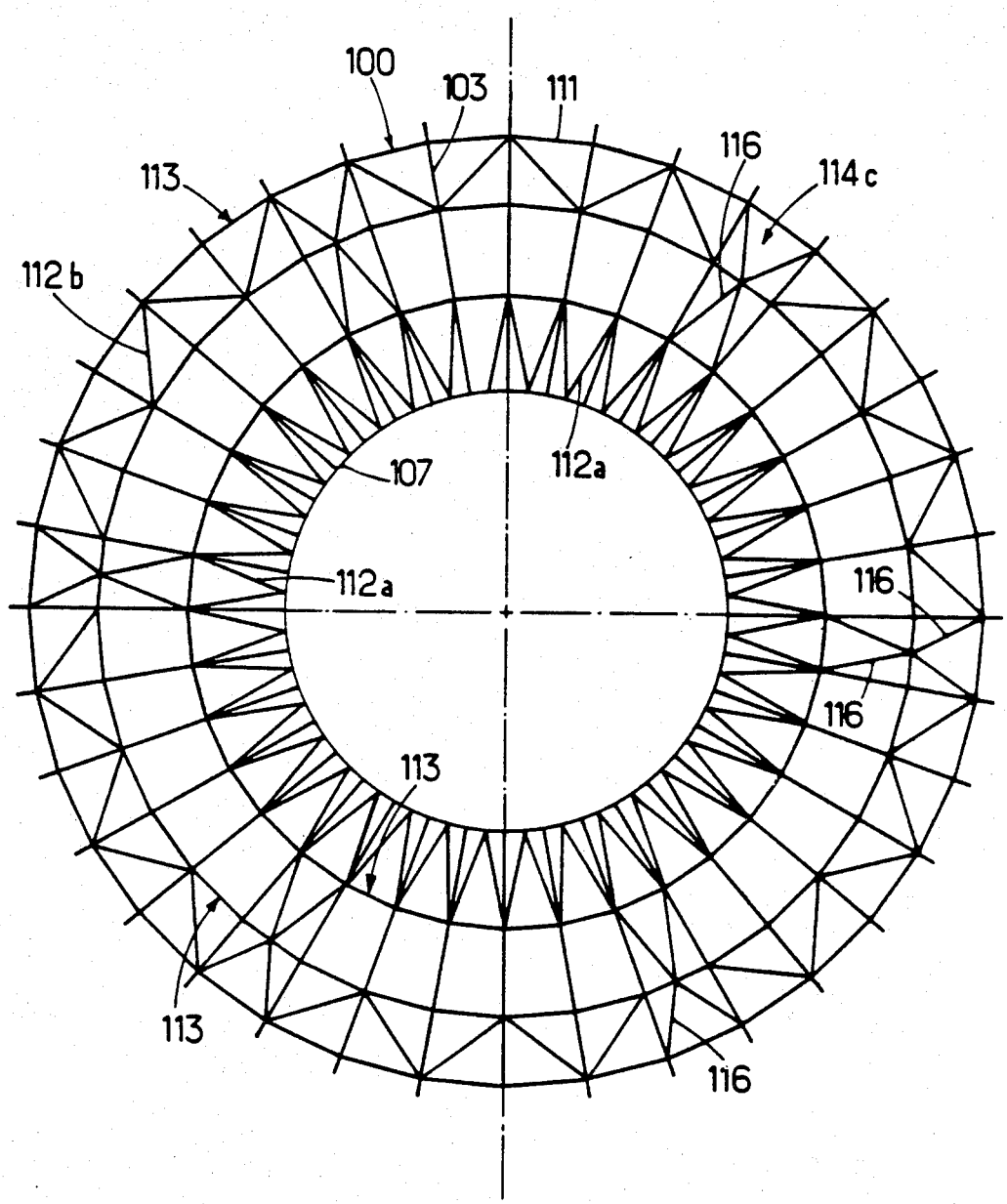
FIG. 16 is a diagrammatic plan view of a carrier structure in accordance with a third embodiment of the invention.

In accordance with the invention, and as shown in FIGS. 9 to 16, the carrier structure is provided with circumferential connecting means 111 between the two circumferential elements 106 at the same radial position on two adjacent radial elements 103. Diagonal bracing and connecting means, denoted by reference numeral 112, are also provided between successive radial elements 103. The assembly of the connecting means and the circumferential elements, as indicated at 111 and 106, forms a connecting ring 113 which is shown in the form of continuous lines in diagrammatic FIGS. 9, 15 and 16. For the purposes of simplification, these Figures do not show the circumferential connecting means and elements. In the construction shown in FIGS. 9, 10 and 15, the carrier structure arrangement comprises five series of circumferential assembly elements 106 which are connected together by the circumferential connecting means 111, therefore forming five rings 113. In FIG. 16, the arrangement only has three series of elements 106, which are connected by connecting means 111, thereby forming three rings 113.

In a preferred embodiment of the invention, the carrier structure comprises two series of diagonal bracing and connecting means 112a and 112b. The connecting means 112a of the innermost series extend between the first series 106a of circumferential elements and the fixing and stiffening means 108. The connecting means 112b of the second series extend between the last series 106e of circumferential elements and either the penultimate series 106d of those elements, as in the embodiments of FIGS. 15 and 16, or the series 106c preceding same, as in the embodiments of FIGS. 9 and 10.

The connection between the radial elements or gussets 103 and the diagonal connecting means 112 occurs, for example, at the intersection of the elements 103 and the circumferential elements 106, or the fixing means 108 as regards the connecting means of the first series. The three structural elements 103, 112 and 106 or 108 are therefore joined and rigidly secured at their intersection.

In the construction shown in FIGS. 9 to 15, the diagonal connecting means 112 therefore form a diagonal connection between two successive radial elements or gussets 103.

FIG. 16 shows a different embodiment in which each diagonal connecting means 112a of the internal series connects a radial element or gusset 103 to the second connecting ring 107 at the center of the portion thereof which is between two elements 103. Each element 103 is thus connected to the ring 107 by two connecting means 112.

In addition, the carrier structure can comprise a certain number of reinforcing arms 114a, 114b or 114c. Generally, the reinforcing arms comprise two adjacent radial elements and a series of at least one pair of diagonal connecting means positioned between these radial elements. The diagonal connecting means are so disposed that a series of these means occupies the major part of the space between the fixing means and the last series of circumferential elements. For example, there may be six such reinforcing arms on the carrier structure.

The reinforcing arms can be formed by two adjacent radial elements 103 which are connected together by a series of diagonal connecting means, including certain ones of the diagonal connecting means 112a and 112b previously described. The reinforcing arms further include additional means 115 and 116 which are disposed in a crossed configuration and in pairs in the space between each series of circumferential elements 106 and in the space between the first series of such elements and the fixing means 108.

In particular, in the construction shown in FIG. 15, a set of diagonal connecting means 112b and 115 are respectively disposed in each of the two spaces between the last three series of circumferential elements. On the other hand, in the construction shown in FIGS. 9 and 10, one set of connecting means 112b and 115 are disposed in the space between the last series and that preceding the penultimate series.

In the embodiment shown in FIG. 16, the reinforcing arms 114c comprise the diagonal connecting means 112a of the first series, and a pair of connecting means 116 which is disposed in each respective space between the first and the second and the second and the third series of circumferential elements 106. The connecting means 116 are each connected to the circumferential connecting means 111, connecting the opposite circumferential elements 106 of the second series, and to a gusset 103.

It will be appreciated that the foregoing description of the reinforcing arms may be applied to structures comprising a number of series of circumferential elements other than those illustrated in the drawings.

FIGS. 10 to 14 show in greater detail the manner in which the various elements of the structure can be assembled. In general, the connection between the connecting means and the radial elements can be at the intersection of those elements and circumferential elements 106.

Five series of circumferential assembly elements 106a, 106b, 106c, 106d and 106e are mounted on each gusset 103. As regards the first or internal series, it can be seen in FIG. 11 that the series comprises flat bars 106a. The bars that are between two gussets 103 which constitute a reinforcing arm 106a can be greater in length than the other bars in the series.

Figure 12:
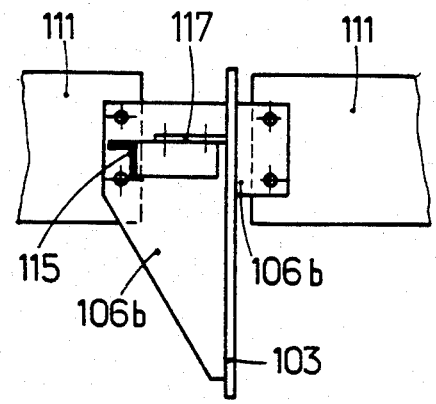
FIG. 12 is a view in cross-section taken along line BB in FIG. 10 of a part of the structure shown therein.
Figure 11:
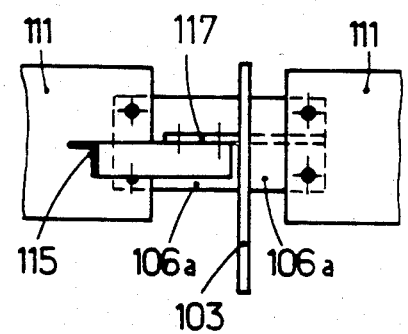
FIG. 11 is a view in cross-section taken along line AA in FIG. 10 of part of the structure shown therein.

As shown in FIG. 12, the second series 106b is in principle formed by flat bars, except in the reinforcing arms where the circumferential elements are gussets.

Figure 13:
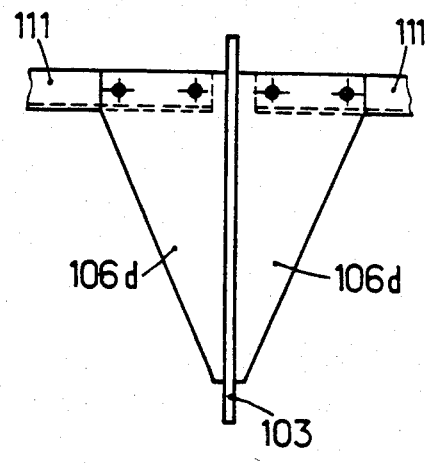
FIG. 13 is a view in cross-section taken along line CC in FIG. 10 of part of the structure shown therein.

The third and fifth series are formed by flat bars. FIG. 14 shows for example the flat bars 106e of the fifth series. As seen in FIG. 13, the fourth series is formed by gussets 106d.

The circumferential connecting means 111 are generally formed by angle members which are bolted to the circumferential elements, or by flat bar members. Angle members also constitute the diagonal connecting means 112, 115 or 116.

In each series, the successive angle members, that is to say, each pair of angle members which are disposed between three successive radial gussets, are disposed at an angle relative to each other. In general, such angle members are bolted to flat bar members 118, or plates, which fix the angle formed by the radial gussets and the circumferential stiffening members, gussets or flat bars, and are perpendicular thereto. In the case of the reinforcing arms, the angle members are also mounted on the plates 118 at their intersection with another angle member.

Referring to FIGS. 2 and 10, two inclined transverse members 119 may be disposed within a reinforcing arm 114, between the series 3 and 4 of circumferential elements. Each member 119 connects the apex of an element 106 of the series 4 to the base of an element 106 of the series 3.

It will be appreciated by those of ordinary skill in the art that many variations can be made to the disclosed embodiments without thereby departing from the scope of the invention. For example, it is possible to utilize any other suitable means for fixing the male and female elements to the carrier structure or to the table, other than those which have been specifically described herein. Thus, the slideway could be welded to the table or to the carrier structure, rather than being bolted. It will be appreciated that the fork-type fitting of the slideway which is described in relation to the embodiment shown in FIG. 3 could also be applied to any slideway in another embodiment.

In addition, it is possible to use any shaped element of a different configuration from the U-shaped configuration described above for the slideway. Thus, it would be possible for the female element to comprise a ball bearing-type or self-lubricating mounting bushing or sleeve in which a shaft would be mounted to constitute the male element, the free ends of the shaft, which project from the sleeve, being connected to the table or to the structure while the bushing or sleeve is of course fixed to the other of those components.

It will also be noted that the spindle members carrying the slide shoes or the rollers forming the male part of the connecting element need not be fixed directly to an element of the structure, in the constructions where the male element is fixed with respect to the table, but may be fixed by way of a spindle-carrier member, as described in relation to the embodiment of FIG. 6, that member being fixed to the structure.

In addition, it is possible to modify the construction shown in the Figures by reversing the arrangement of the assembly elements, that is to say, with the slideway being fixed with respect to the table and the male element fixed to the carrier structure.

It would also be possible for the connecting assembly to incorporate a wearing member between the male element, such as the rollers or slide shoes, and the female element such as the slideway. The wearing member could be of an identical configuration to the female element, and would be of a precise thickness. It would permit the male element to be laterally adjusted or shimmed relative to the female element, and would make it possible to omit the adjustment of the height of the female or male element.

It will be appreciated that the invention, in particular the table/carrier structure connecting assembly, is applicable to any filter comprising a carrier structure and a horizontal filtration table which is supported by the carrier structure, irrespective of the actual constitution of the table. It will be appreciated that the type of table specifically described hereinbefore is given only by way of example. The described carrier structure could also be used independently, with another type of table and optionally, in that case, the connection between the table and the structure could be made in any suitable, known manner other than that specifically described.

It will be appreciated that the invention is in no way intended to be limited to the embodiments described and illustrated, which were given only by way of example. In particular, the invention covers all the means constituting technical equivalents of the means described, and combinations thereof, if they are used within the scope of the protection claimed.

What is claimed is:

1. A rotary horizontal table filter, comprising
a rotatably driven carrier structure;
a circular horizontal filtration table supported on said structure;
the structure and the table being vertically separated so as to have a space therein between;
means for connecting said table and said structure to provide at least one radial degree of freedom of movement of the table relative to the structure;
said connecting means being at least partially disposed in said space and said connecting means comprises an assembly of a male element and a female element, respective ones of said elements being fixed to the table and the structure.

2. A filter according to claim 1 wherein the female element is a self-lubricating bushing or sleeve and the male element is a shaft which is mounted in the bushing or sleeve with the ends of the shaft projected therefrom, respective ones of said bushing or sleeve and shaft ends being fixed to the table and the structure.

3. A filter according to claim 1 wherein said female element is a radial slideway and the male element comprises a running member, in the form of one of a roller and a slide shoe, and made from a material having a low coefficient of friction with respect to the female element, the male element being disposed in the slideway in such a way that said running member is normally in contact with the bottom of the slideway.

4. A filter according to claim 3 wherein said slideway is partially closed by a pair of guide members which retain the male element in the slideway.

5. A filter according to claim 3 wherein said slideway is fixed with respect to the filtration table and the male element comprises a spindle on which one or more slide shoes are mounted and which is fixed near the upper end of a radial assembly element of the carrier structure which is disposed vertically below the slideway.

6. A filter according to claim 5 further including angle members fixed to the slideway on respective sides of two opposed radial walls of two adjacent sectors, said angle members being disposed in such a way as to form a gutter for the recovery of filtrate which may have infiltrated below the filtration table.

7. A filter according to claim 3 wherein said male element comprises a spindle which is attached to at least one of the two opposed radial walls of two adjacent sectors, and shoes mounted on said spindle, said slideway being fixed with respect to the structure.

8. A filter according to claim 3 wherein said male element comprises at least one pair of rollers which run on the bottom of the slideway, and at least one transverse slide shoe which is disposed parallel to the axis of rotation of said rollers and outside the plane of rolling movement thereof adjacent said pair of rollers, and capable of bearing against the side walls of the slideway.

9. A filter according to claim 8 wherein said pair of rollers is mounted on a spindle member which is attached to two opposed radial walls of two adjacent sectors and which is fixed substantially at the lower end thereof.

10. A filter according to claim 3 characterized in that said running member is made from an anti-friction metal.

11. A filter according to claim 3 wherein said running member is made from a polymer having a high molecular weight.

12. The filter of claim 11 wherein said polymer is polyethylene.

13. The filter of claim 11 wherein said polymer is polypropylene.

14. The filter of claim 11 wherein said polymer is glass-fiber reinforced polyamide 6.

15. The filter of claim 11 wherein said polymer is graphite-filled polytetrafluoroethylene.

16. The filter of claim 11 wherein said polymer is difluorinated polyvinylidene.

17. A filter according to claim 3 wherein said slide shoe has a substantially parallelepipedic shape, and the intersection of the faces of said shoe which come into contact with the bottom portion and a side wall of the slideway is chamferred.

18. The filter of claim 3 wherein said radial slideway has a substantially U-shaped configuration.

19. The filter of claim 3 wherein said running member is made from a copper alloy.

20. The filter of claim 19 wherein said copper alloy is bronze.

21. The filter of claim 3 wherein said running member is made of graphite.

22. A filter according to claim 1 wherein the carrier structure comprises radial elements and wherein the table is formed by a plurality of sectors, each comprising radial walls, one or more bottom walls and circumferential walls for defining one or more boxes, and an upper wall with orifices therethrough, further wherein one of the elements of said connecting means is fixed to the lower end of two opposed radial walls of two adjacent sectors and the other of the elements is fixed to the upper end of a radial element of the structure, which radial element is disposed vertically below said radial walls of the table.

23. A filter according to claim 22 wherein the element of the connecting means that is fixed to the radial element of the carrier structure is mounted astride said radial element by a fork configuration, and connected by at least one screwthreaded rod to a second structure element which is fixed to the radial element and perpendicular thereto, in order to provide height adjustment of the position thereof.

24. A filter according to claim 22 comprising at least two assemblies of male and female elements per box, said assemblies being fixed by means of one of their elements to the opposed radial walls of two adjacent sectors.

25. A filter according to claim 22 further comprising a resilient sealing member between the parts which are in contact of two opposed radial walls of two adjacent sectors, said sealing member including a material which undergoes vulcanisation at ambient temperature.

26. A filter according to claim 25 characterized in that the portions of two opposed radial walls of two adjacent sectors which are in contact are welded and the weld is covered by said sealing member.

27. A filter according to claim 1 further including a wear plate disposed between the female element and the male element.

28. A filter according to claim 1 further including an endless belt of flexible material which engages the external edge of the filtration table and which comes out of contact with said external edge adjacent the region for removal of the filter cake and for cleaning of the table.

* * * * *